Patented June 17, 1952

2,600,455

UNITED STATES PATENT OFFICE 2,600,455

FIRE-RETARDANT COMPOSITIONS

Ivan V. Wilson, Wakefield, and Ralph Marotta, Malden, Mass., assignors to Monsanto Chemical Company, St. Louis, Mo., a corporation of Delaware No Drawing. Application August 31, 1950, Serial No. 182,633

13 Claims. (Cl. 260—6)

The present invention relates to fire-retardant compositions, and it more particularly relates to potentially intumescing, fire-retardant water base coating compositions for the coating of combustile or heat-deformable substrates to protect such substrates from fire or heat, and also for coating a wide variety of substrates to prevent flame propagation.

It has been proposed heretofore to employ various types of water-soluble phosphates in water base coating compositions for the purpose of forming coatings which intumesce or form a cellular char when exposed to a direct flame or high temperatures. Coatings produced from such compositions while satisfactory for limited purposes are not satisfactory when they must be subjected to frequent washings or high humidity conditions since the water-soluble phosphates are leached out of the coating under such conditions and the coating loses its fire-retardant properties.

It has also been proposed to use urea and formaldehyde or partially condensed urea-formaldehyde condensation products as film-forming agents or binding materials for the water-soluble phosphates to give some permanency to the coating and thus protect the substrate and also provide an ornamental finish thereon. Thermosetting resins of the amine-aldehyde type, of which urea-formaldehyde condensation products are representative, do not, however, appreciably improve the water resistance of the coatings, that is, the ability of the coatings to withstand frequent washings or high humidity conditions. Accordingly, when such coatings are subjected to frequent washings with water or to high humidity conditions, the coatings lose their fire-retardant properties and do not adequately protect the underlying substrate from heat or an open flame.

In accordance with the present invention, on the other hand, it is possible to formulate compositions which are not only highly intumescing when exposed to heat or flame but also retain their intumescing and fire-retardant properties after they have been washed with water or exposed to high humidity conditions. In accordance with the present invention it is also possible to produce formulations which dry down to form coatings having excellent resistance to checking or cracking.

It is one object of this invention to provide improved potentially intumescing fire-retardant compositions.

It is a further object of this invention to provide fire-retardant water base coating compositions which form coatings having good resistance to washing and high humidity conditions without appreciable loss in fire-retardant properties.

It is a further object of this invention to provide fire-retardant, water base coating compositions which form coatings having excellent resistance to checking and cracking as well as good resistance to washing and high humidity conditions.

It is a further object of this invention to provide fire-retardant, water base coating compositions which form coatings having improved intumescing properties when subjected to heat or an open flame.

Still further objects and advantages of this invention will appear in the following description and the appended claims.

The fire-retardant compositions of this invention include dry or substantially dry mixtures and water dispersions of such mixtures. The dry or substantially dry mixtures comprise, in general, a solid, water-dispersible, heat-convertible, amino-plast or amino-aldehyde condensation product, preferably a water-dispersible urea-formaldehyde condensation product, and a reaction product of phosphorous pentoxide and ammonia which is substantially insoluble in cold water. The compositions preferably also comprise one or more of the following ingredients: a water-insoluble polyhydric compound such as water-insoluble polypentaerythritols, for example, dipentaerythritol, or unhydrolyzed starch, for example, unhydrolyzed corn starch or a mixture of unhydrolyzed and hydrolyzed starch; or fibrous materials as, for example, proteinaceous fibers such as wool flock, vegetable fibers such as cotton or linen flock, regenerated cellulose fibers and mineral fibers such as asbestos fibers. Of these fibrous materials proteinaceous fibers such as wool flock are preferred because they improve the intumescing properties of the composition whereas the other fibrous materials decrease the intumescence of the composition to some extent. The fibrous materials when used serve to minimize the checking and cracking tendencies of the aminoplast coatings.

The compositions may also contain relatively non-combustible plasticizers for the aminoplast. The aryl sulfonamides and substituted aryl sulfonamides such as N-ethyl toluene sulfonamide are particularly preferred for this purpose because of their high compatibility with the aminoplast resins. The compositions may also contain various materials which are commonly used in coatings as, for example, inorganic and organic pigments, and thickening or dispersing agents such as ammonium caseinate, soya protein, polyvinyl alcohol, carboxy methyl cellulose and the like. The dry or substantially dry compositions described above have a shelf life of several months.

The liquid coating compositions comprise the above described ingredients dispersed in water. These compositions may be prepared in various ways, for example, by premixing the dry ingredients and then adding the mixed ingredients to the water, or the various ingredients may be added to the water or a water dispersion of the aminoplast with stirring to form the dispersion. The aminoplast may be prepared in water and the ingredients added thereto or the ingredients used in preparing the aminoplast, for example, urea and formaldehyde may be added to the water without any special effort being made to form a condensate. The procedure of preparing a preformed aminoplast is preferred since in such instances the aldehyde used in preparing the aminoplast is chemically combined with urea or some other amino compound and the composition does not give off aldehyde fumes. On the other hand, if the ingredients used in preparing the aminoplast are added to water, without any attempt being made to cause chemical combination of the aldehyde with the amino compounds aldehyde fumes are liberated and this is undesirable in certain applications. Moreover, a coating prepared from the latter solution exhibits greater water sensitivity than a coating prepared from a preformed aminoplast. The liquid coating compositions have satisfactory stability for coating purposes and generally remain fluid for a period of 8 to 20 hours or more which is sufficiently ample for conventional methods of application such as spraying, brushing, dipping or roll coating or the like.

The water-dispersible, heat-convertible aminoplasts or amino-aldehyde condensation products employed in the compositions of this invention include a wide variety of materials which are prepared from aldehydes and an organic compound containing at least one and preferably two amino groups having at least two and preferably three replaceable hydrogen atoms. The aminoplasts employed in the compositions of this invention are preferably water-soluble but should at least be water-dispersible, that is, they should not be so far condensed as to be non-dispersible in water, and they should be capable of forming a substantially continuous film on drying. They should also be capable of polymerizing or curing at normal room temperatures or elevated temperatures in the presence of the other ingredients of the composition to form water-insoluble films.

The preferred aminoplasts for use in the compositions of this invention are the water-dispersible, heat-convertible, urea-formaldehyde condensation products, and particularly the condensation products of 1 molecular proportion of urea and 1.6 to 2.25 molecular proportions of formaldehyde. Such condensation products may be used in the form of a dry solid or as a water dispersion or water solution.

As examples of other aminoplasts which are useful as the film-forming ingredients in the compositions of this invention may be mentioned the water-dispersible, heat-convertible condensation products of an aldehyde, preferably formaldehyde, with thiourea, guanidine, cyanamide, dicyandiamide and amino triazines having at least two amino groups as, for example, melamine, 2-chloro-4,6 diamino-1,3,5 triazine, 2 hydroxy-4,6-diamino-1,3,5 triazine, alkyl guanamines, aryl guanamines and the like. In general, the useful aminoplasts are prepared by partially condensing formaldehyde with amino compounds containing from 1 to 9 carbon atoms and having the grouping

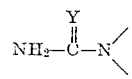

where Y is a member selected from the class consisting of O, S and N—, and where N< represents a nitrogen atom having two single valences attached to separate hydrogen or carbon atoms or where the two free valences of the nitrogen atom represent a double bond attached to a carbon atom. The group N— of the above-described amino compounds represents a nitrogen atom having one free valence which is attached to a carbon or hydrogen atom. The condensation products may be formed by using sufficient formaldehyde to react with from at least one to all of the replaceable hydrogen atoms of the amino groups.

The term "aminoplast" as used herein also includes the water-dispersible, heat-convertible, alkylated derivatives or modifications of the simple amino compound-aldehyde condensation products. Such alkylated derivatives may be prepared, for example, by reacting the simple condensation products with an alcohol according to procedures well known in the prior art and as illustrated in the patent to Widmer, No. 2,197,357.

The aminoplasts may be prepared by using various aldehydes instead of formaldehyde. As examples of these may be mentioned acetaldehyde, propionaldehyde, furfural, glyoxal and the like. However, formaldehyde and water-soluble polymers of formaldehyde such as paraformaldehyde not only are cheaper but also give superior aminoplasts for the purposes of this invention and are therefore preferred.

The substantially water-insoluble reaction products of phosphorous pentoxide and ammonia, as employed in the compositions of this invention, serve as fire-retardant or fire-resistant materials, although they do not actually intumesce in the absence of other ingredients when exposed to an open flame. These reaction products may be prepared in various ways. However, the manner in which they are prepared has some effect on their usefulness.

The reaction product of phosphorous pentoxide and ammonia which is preferably used in the compositions of this invention is the product prepared by first burning phosphorous in an excess of air and then immediately reacting the resulting mixture with gaseous anhydrous ammonia at an elevated temperature, preferably at a temperature of 425 to 650° C. The product is then removed from the gas stream by using a suitable separator such as a cyclone separator or a bag filter or the like. The resulting solid is then heated in an atmosphere of gaseous anhydrous ammonia for 30 to 90 minutes at a temperature of 200 to 300° C. The white solid thus obtained is preferably comminuted before use. This solid is substantially insoluble in cold water, that is, water at a temperature of 1 to 30° C. and has a substantially neutral or alkaline reaction when suspended in water in the form of a 1% slurry. The ammonia to $P_2O_5$ ratio of the product is generally above 2:1, and is preferably between 2.5 and 2.6 to 1.

A wide variety of water-insoluble polyhydric compounds may be used in the compositions of this invention. The polypentaerythritols and starches are two types of materials which come within this class of compounds and which are particularly useful and preferred in the compositions described herein. The polypentaerythritol may be used without the starch or the starch may be used without the polypentaerythritol. However, best results are usually obtained by using both of these ingredients in the compositions. A weight ratio between 10:1 and 1:10 is especially useful in such cases. The polypentaerythritol and starch do not give a coating having equivalent properties and for some purposes it is preferred to use the polypentaerythritols particularly when enhanced intumescing properties and water resistance are desired. Starch, on the other hand, is sometimes preferred since it is possible to replace a minor amount say up to 30% of the aminoplast with starch without materially detracting from the quality of the coating with regard to its fire-retardant properties and its resistance to washing and checking.

The polypentaerythritol when used in the compositions herein described may be employed in its various polymeric forms, for example, as a dimer, trimer, etc. As specific examples of polypentaerythritols may be mentioned dipentaerythritol and tripentaerythritol and mixtures thereof. The polypentaerythritols perform two important functions in the compositions herein described. First of all they improve the intumescing properties of the coating with the result that it is possible to obtain equivalent protection against heat or an open flame with a thinner coating. In the second place they serve to prevent checking and cracking of the coating, and being water-insoluble or substantially water-insoluble do not wash out of the coating with the result that the coating remains resistant to checking and cracking and also retains its intumescing properties after a substantial number of washings.

The unhydrolyzed starch, when used in the compositions of this invention has several important advantages for certain purposes. The unhydrolyzed starch is a cheap material and when low cost coatings are especially desired a considerable amount of starch say up to 250% by weight of the aminoplast solid of the composition, may be used without appreciably lowering the quality of the coating. The addition of starch to the coating also helps in improving the check and crack resistance of the coating. This is particularly true when hydrolyzed starch is used. However, hydrolyzed starch has relatively less water resistance than unhydrolyzed starch and for this reason, when hydrolyzed starch is used, a mixture of the two types of starch is preferred if a more water resistant coating is to be obtained. It is preferred in using such mixtures to employ a major portion of unhydrolyzed starch, that is, 55% or more and a minor portion, that is, 45% or less of hydrolyzed starch, based on the starch mixture.

It is not necessary to add the starch as a separate ingredient since satisfactory results may be obtained by adding the starch to the ingredients used in preparing the aminoplast, namely the aldehyde and the amino compound in water, and then condensing the resulting mixture to form a water-dispersible product.

As examples of unhydrolyzed starches which are useful in the compositions of this invention may be mentioned unhydrolyzed corn, waxy maize, rice, wheat, tapioca, sweet potato, Irish potato and sorghum starches. These starches are readily hydrolyzed by cooking them in water and in the hydrolyzed condition are suitable as the hydrolyzed starch portion when starch mixtures are employed herein.

The liquid coating compositions of this invention dry down at room temperature to form films which are substantially water-resistant at the end of a 48-hour drying period, and are characterized by good adhesion to combustible substrates such as wood, plywood, fiberboard, acoustical fiber tile and certain types of inflammable or combustible plastics. The liquid compositions may also be applied to various heat deformable substrates such as thermoplastic resins and also to iron, brass, aluminum and other metal substrates to provide protection against heat deformation and flame propagation. If desired, the coatings may be heated or baked to shorten the period of curing or polymerizing of the aminoplast. The coatings formed from these compositions possess the property of intumescing when exposed to an open flame or to heat and do not appreciably lose this property even when the coating is washed with water periodically or exposed to high humidity conditions over the normal life of the coating. By "intumesce" is meant the property of frothing or puffing in such a manner as to produce a considerable swollen, solid cellular residue, which in itself is practically non-combustible. Such residue is sufficiently continuous and adherent to protect the substrate from combustion or the deleterious effects of heat and accomplishes this result by preventing access of air to the substrate and at the same time insulating the substrate from heat.

A further understanding of the compositions of this invention will be obtained from the following specific examples which are intended to illustrate several of the most desirable compositions but are not intended to limit the scope of the invention, parts and percentages being by weight unless otherwise specified.

Example I

Thirty-five parts of a water solution of urea-formaldehyde condensation product was first prepared by heating 1 mol of urea and 2 mols of formaldehyde under slightly acidic conditions in the presence of sufficient water to provide a solution containing 50% solids, which required about 30 minutes. This solution was adjusted to a pH of 7 with sodium hydroxide. Ten and five-tenths parts of a substantially cold water-insoluble reaction product of phosphorous pentoxide and ammonia and 2 parts of water were added to the solution of the urea-formaldehyde condensation mixture and the resulting mass was well stirred to form a uniform dispersion.

The water base paint prepared as described immediately above was applied to a panel of wood by brushing using an amount of paint sufficient to provide 25 grams of solids per square foot of wood surface. The coating thus applied was allowed to age for 48 hours and then was exposed to the direct flame of a Bunsen burner for 5 minutes. During exposure to the flame the coating swelled and intumesced to form a voluminous, cellular char which protected the underlying wood surface from the flame. On removing the flame and scraping away the char, it was found that the wood was not damaged by the flame.

The reaction product of phosphorous pentoxide and ammonia used in this and the following examples was prepared by first burning phosphorous in an excess of air and immediately reacting the combustion products with gaseous anhydrous ammonia at a temperature of 600° C., after which the resulting solid was heated in an atmosphere of gaseous anhydrous ammonia for 1 hour at a temperature of 250° C. This product was substantially insoluble in water at a temperature of 20° C.

*Example II*

Fifty parts of a water solution of urea-formaldehyde condensation product was first prepared by heating 1 mol of urea and 2 mols of formaldehyde under slightly acidic conditions in the presence of sufficient water to provide a solution containing 50% solids, after which the solution was adjusted to a pH of 7. Twelve and five-tenths parts of finely divided water-insoluble reaction product of phosphorous pentoxide and ammonia and 12.5 parts of finely divided dipentaerythritol were stirred into the urea-formaldehyde solution along with 25 parts of water until a homogeneous suspension was obtained. The resulting composition contained 25% urea-formaldehyde solids, 12.5% of the reaction product of phosphorous pentoxide and ammonia and 12.5% dipentaerythritol solids. The composition remained fluid and useable for 8 hours.

The above composition was applied to maple boards by brushing. After allowing the coating to age for two days, the urea-formaldehyde condensation product had cured or polymerized sufficiently to form a water-insoluble film. A portion of the coated board was exposed to the direct flame of a Bunsen burner for five minutes, whereupon the coating swelled and intumesced to form a non-combustible cellular char which acted as an insulating blanket and an effective oxygen barrier. Upon removing the Bunsen burner flame and scraping away the puffed char of the coating it was noted that the underlying wood was not damaged by the flame or heat.

A duplicate coated board (not exposed to flame) was allowed to remain submerged for 10 minutes in running water and then dried overnight at room temperature. This piece was then exposed to the direct flame of a Bunsen burner for 5 minutes, whereupon the coating intumesced and swelled to form a puffed char of substantially the same volume as obtained with the coating which had not been treated with water. On scraping away the puffed char it was noted that the underlying wood surface was undamaged.

*Example III*

A white paint was prepared by stirring the following ingredients:

| | Parts |
|---|---|
| Spray dried urea-formaldehyde condensation product water-dispersible powder [1] | 20 |
| Water-insoluble reaction product of phosphorous pentoxide and ammonia | 8 |
| Dipentaerythritol | 14 |
| Wool flock [2] | 4 |
| TiO₂ (as a pigment) | 4 |
| Water | 50 |

[1] Prepared by condensing 1 mol of urea and 1.84 mols of formaldehyde.
[2] This was a commercial grade of wool fibers averaging ⅛ inch in length.

The homogeneous paint thus obtained remained fluid and useable for a period of 8 hours. This paint was applied to fiberboard by spraying the paint in an amount sufficient to provide 20 grams of paint solids per square foot of board surface. After the coating has been aged for a period of one week, the coated board was subjected to Federal Specification Fire Test SS-A-118a Amendment 1. Classification F of this test for slow burning materials was easily passed.

The coatings produced from the composition described in this example exhibit superior resistance to checking and cracking and this is believed to be due to the presence of the wool flock or possibly the wool flock in combination with the dipentaerythritol. It was noted that these coatings exhibited substantially the same intumescence as the coatings produced from the compositions of Example II. The titanium dioxide was used to give a pigmented coating and can be omitted if a clear coating is desired.

*Example IV*

A coating composition was prepared by stirring the following ingredients:

| | Parts |
|---|---|
| Water solution of ureaformaldehyde condensation product containing 50% solids [1] | 35.2 |
| Water-insoluble reaction product of phosphorous pentoxide and ammonia | 7.1 |
| Tripentaerythritol | 12.0 |
| Wool flock | 2.8 |
| N-ethyl toluene sulfonamide | 7.0 |
| TiO₂ | 3.5 |
| Water | 32.4 |

[1] Prepared by condensing 1 mol of urea with 2.25 mols of formaldehyde in water.

The resulting homogenous composition remained fluid and useable for a period of 12 hours. This paint was applied to a poplar plywood in an amount sufficient to provide a coating containing 19 grams of solids per square foot of wood surface. After the coating had been allowed to age for 1 week at a temperature of 77° F. and at a relative humidity of 50%, the flame of a Bunsen burner was impinged directly on the coating for a period of 5 minutes. The coating swelled or intumesced to a voluminous, carbonaceous char which localized the flame and protected the underlying surface by preventing penetration of heat and excluding oxygen.

The tripentaerythritol performed in somewhat the same manner as the dipentaerythritol of Example II, but contributed slightly less intumescence.

The N-ethyl toluene sulfonamide served to further reduce any tendency of the coating to check or crack without detracting appreciably from the fire-retardant and intumescing properties of the coating.

*Example V*

A coating composition was prepared by stirring the following ingredients:

| | Parts |
|---|---|
| Spray dried urea-formaldehyde condensation product, water-dispersible powder | 12.9 |
| Water-insoluble reaction product of phosphorous pentoxide and ammonia | 4.3 |
| Unhydrolyzed corn starch | 22.9 |
| N-ethyl toluene sulfonamide | 1.4 |
| p-Toluene sulfonamide | 1.4 |
| p-Toluene sulfonamide-ethylene oxide condensation product [1] | 1.4 |
| Wool flock | 1.7 |
| TiO₂ | 4.1 |
| Water | 50.0 |

[1] Prepared by condensing 1 mol of the sulfonamide with 2 mols of the ethylene oxide.

The resulting homogeneous composition remained fluid and useable for a period of 12 hours. This paint was applied to fiber board by spraying the paint in an amount sufficient to provide 25 grams of paint solids per square foot of board surface. After the coating had been aged for 24 hours, the coated board was subjected to Federal Specification Fire Test SS-A-118a amendment 1. Classification F of this test for slow burning materials was passed.

The coatings produced from the composition described in this example exhibit superior resistance to checking and cracking and have good resistance to washing with cold water.

The coating compositions prepared in accordance with the preceding examples contain from 37 to 12.9% of urea-formaldehyde solids but it is to be understood that the liquid compositions of this invention are not limited to these percentages of the aminoplast. In general, the liquid compositions contain from 5 to 40% by weight of the aminoplast, although even smaller amounts may be used if starch is also employed and up to 45% by weight may be used if the viscosity of the solution is not too high to be objectionable. In most instances, however, it is preferred to employ liquid coating compositions comprising from 10 to 40% by weight of the aminoplast.

The water-insoluble reaction products of phosphorous pentoxide and ammonia, according to the preceding examples, are employed in amounts varying between 60 and 33.3% based on the weight of the aminoplast in the composition. These amounts may be varied to some extent depending upon various factors such as the thickness of coating, and the substrate to be protected. In general, such water-insoluble reaction products of phosphorous pentoxide and ammonia are employed in amounts varying between 15 and 100% by weight, based on the aminoplast. However, for most purposes a preferred range is 25 to 60% by weight, based on the aminoplast.

The water-insoluble polyhydric compound such as starch or the polypentaerythritols employed in Examples II to V is illustrated as varying between about 59 to 177% by weight, based on the aminoplast. For most purposes these amounts may be varied considerably depending upon the particular compound used without reducing the quality of the coating. Thus, in general, the polypentaerythritol is employed in amounts varying between about 20 and 150% by weight, based on the aminoplast. Best results are usually obtained, however, by employing from 30 to 80% by weight of the polypentaerythritol, based on the aminoplast, and these amounts are preferred. When starch is used as illustrated in Example IV it is generally employed in amounts varying between 30 and 250% on the weight of the aminoplast, although when a polypentaerythritol is also employed amounts as low as 5% may be used. For best results, the starch is preferably employed in amounts ranging from 50 to 200% on the weight of the aminoplast. From the foregoing it will be seen that the water-insoluble polyhydric compound may generally be used in amounts varying between about 20 and 200% on the weight of the aminoplast depending on the particular polyhydric compound which is used in the composition.

In all of the foregoing examples the aminoplast and the various additives may be premixed in the dry or substantially dry state before they are mixed with water to form the coating composition. This is preferable in most instances since the dry ingredients have a relatively long shelf life and may be premixed and stored for a considerable period of time before they are actually employed in brushing and spraying formulations. Thus, the dry ingredients remain stable over a period of 2 to 3 months whereas the liquid coating compositions generally must be used within a period of 8 to 20 hours.

It will be understood that the amounts of the various ingredients used in the liquid coating compositions of this invention must be adjusted so that the final composition is still liquid and capable of being applied to a substrate for coating purposes. Compositions containing from 10 to 50% by weight of total solids are generally capable of being brushed or sprayed whereas compositions containing from 50 to 75% solids may be applied by roll coating or the like. In general, the coating compositions of this invention comprise from about 10 to 75% solids by weight and from about 90 to 25% by weight of water. For most purposes, coating compositions comprising from about 20 to 60% solids by weight and from 80 to 40% water are preferred.

*Example VI*

A fire-retardant dry composition was prepared by mixing the following ingredients:

| | Parts |
|---|---|
| Spray dried urea-formaldehyde condensation product, water dispersible powder | 26.2 |
| Water-insoluble reaction product of phosphorous pentoxide and ammonia | 8.8 |
| Dipentaerythritol | 15.3 |
| Wool flock | 3.5 |
| Corn starch (unhydrolyzed) | 31.5 |
| Rutile $TiO_2$ pigment | 6.0 |
| N-ethyl toluene sulfonamide | 2.9 |
| p-Toluene sulfonamide | 2.9 |
| p-Toluene sulfonamide-ethylene oxide condensation product [1] | 2.9 |

[1] Prepared by condensing 1 mol of the sulfonamide with 2 mols of the ethylene oxide.

In preparing the above mixture all of the ingredients except the sulfonamides and the ethylene oxide condensation product thereof were introduced into a ribbon-blender type mixer. The sulfonamides were all melted together at 50 to 75° C. and then sprayed slowly in the form of a mist into the ingredients in the mixer while the mixer blades were operating. After the sulfonamides were added, the mixing was continued for 30 minutes to insure the preparation of a dry, substantially homogeneous powder. The resulting mixture had a shelf life of two months when stored in a dry condition at normal room temperatures.

The above composition was used to form a liquid coating composition by mixing 1 part of the dry mixture together with 1 part of water until a smooth paint dispersion was obtained. The resulting paint dispersion remained fluid and useable for a period of 16 hours. The paint was sprayed on vegetable fiber acoustical tiles in an amount sufficient to provide a coating consisting of 33 pounds of paint solids per 1000 square feet of substrate surface. The freshly coated tiles were immediately placed in an oven at 250° F. and were allowed to remain in the oven for a period of 10 minutes in order to dry and cure the coating. A representative sample of the coated tiles was conditioned for 24 hours at a temperature of 77° F. and a relative humidity of 50%, after which the flame of a Bunsen burner was impinged directly onto the surface of the tile for a period of 5 minutes. During this period the coating intumesced to form a voluminous, non-combustible, spongy char which prevented destruction of the tile. The uncoated tiles, on the other hand, are highly combustible and burn easily when exposed to a Bunsen flame.

Other samples of the coated tiles were subjected to the fire test described in the publication of the U. S. Department of Commerce entitled "Commercial Standard CS 42-49. Test 6.2:9, Flame resistant—finished surface" was easily passed.

Another sample of the coated tile was tested for water resistance by keeping the surface of the tile wet with water and scrubbing the surface with 2000 strokes of a one-pound brush by the use of an H. A. Gardner standard washability machine. At the end of this period of time, the scrubbed coating had substantially the same appearance as the original coating. The flame of a Bunsen burner was impinged directly on the surface of the scrubbed tile for a period of 5 minutes. During this period of exposure to the flame the coating on the tile intumesced to form a voluminous non-combustible spongy char which prevented destruction of the tile.

The dry compositions of this invention of which the composition of Example VI is illustrative generally comprise from about 10 to 80% by weight of a dry or substantially dry water-dispersible aminoplast as for example a urea-formaldehyde condensation product. The amounts of the water-insoluble reaction product of phosphorous pentoxide and ammonia and the polypentaerythritol or starch used in relation to the aminoplast have already been described in the descriptive matter following Example V. When starch is used as illustrated in Example VI, the compositions comprise from about 6 to 65% by weight of the starch and it is possible under such circumstances to use smaller amounts of the aminoplast, for example, from about 5 to 30% by weight of the aminoplast.

The amount of wool flock or other fibrous material used in the dry or liquid compositions may vary between about 3 to 35% by weight on the aminoplast. Of course, it is understood that the fibrous material may be omitted entirely.

When non-combustible plasticizers such as the sulfonamides illustrated in the examples are employed in the dry or liquid compositions they are generally used in amounts varying between about 5 and 50% by weight on the aminoplast. For best results amounts varying between 20 and 40% by weight on the aminoplast are preferred.

As examples of other non-combustible plasticizers which may be used instead of the aryl sulfonamides may be mentioned triphenyl phosphate and chlorinated biphenyls.

Although titanium dioxide is illustrated in some of the examples as a suitable pigment, it is possible, of course, to use other pigments of the inorganic or organic types instead of the titanium dioxide when a pigmented coating is desired. As examples of suitable inorganic pigments which are useful in this connection may be mentioned barytes, magnesium silicate, clay, calcium phosphate, magnesium ammonium phosphate, lead phosphate, Prussian Blue and the like. Suitable organic pigments include Lithol Red, Hansa Yellow and the like.

Various modifications and changes may be made in the fire-retardant compositions of this invention as will be apparent to those skilled in the art to which the invention appertains without departing from the intent or spirit of the invention described herein. It is understood therefore that the invention is only to be limited by the scope of the appended claims.

What is claimed is:

1. A fire-retardant composition comprising a water-dispersible, heat convertible urea-formaldehyde condensation product and a reaction product of phosphorous pentoxide and ammonia which is substantially insoluble in cold water.

2. A fire-retardant composition comprising a water-dispersible, heat convertible urea-formaldehyde condensation product, a reaction product of phosphorous pentoxide and ammonia which is substantially insoluble in cold water and a cold-water-insoluble polyhydric compound consisting of carbon, oxygen and hydrogen.

3. A fire-retardant composition comprising a water-dispersible, heat convertible urea-formaldehyde condensation product, a reaction product of phosphorous pentoxide and ammonia which is substantially insoluble in cold water and a cold-water-insoluble polypentaerythritol.

4. A fire-retardant composition according to claim 3, but further characterized in that the polypentaerythritol is dipentaerythritol.

5. A fire-retardant composition according to claim 3, but further characterized in that the polypentaerythritol is tripentaerythritol.

6. A fire-retardant composition comprising a water-dispersible, heat convertible urea-formaldehyde condensation product, from 15 to 100% on the weight of said condensation product of a reaction product of phosphorous pentoxide and ammonia which is substantially insoluble in cold water and from 20 to 150% on the weight of said condensation product of a cold-water-insoluble polypentaerythritol.

7. A fire-retardant composition comprising a water-dispersible, heat convertible urea-formaldehyde condensation product, a reaction product of phosphorous pentoxide and ammonia which is substantially insoluble in cold water and a cold-water-insoluble starch.

8. A fire-retardant composition comprising a water-dispersible, heat-convertible urea-formaldehyde condensation product, from 15 to 100% on the weight of said condensation product of a reaction product of phosphorous pentoxide and ammonia which is substantially insoluble in cold water and from 30 to 250% on the weight of said condensation product of a cold-water-insoluble starch.

9. A fire-retardant composition comprising a water-dispersible, heat convertible urea formaldehyde condensation product, a reaction product of phosphorous pentoxide and ammonia which is substantially insoluble in cold water and a mixture of unhydrolyzed starch and hydrolyzed starch.

10. A substrate coated on at least one surface thereof with a water-resistant coating comprising a polymerized urea-formaldehyde resin and a substantially cold-water-insoluble reaction product of phosphorous pentoxide and ammonia.

11. A substrate coated on at least one surface thereof with a water-resistant coating comprising a polymerized urea-formaldehyde resin, a substantially cold-water-insoluble reaction product of phosphorous pentoxide and ammonia, and a cold-water-insoluble polyhydric compound consisting of carbon, hydrogen and oxygen atoms.

12. A fire-retardant composition comprising (1) a water-dispersible, heat-convertible condensation product of an aldehyde and an amino compound containing from 1 to 9 carbon atoms and having the grouping

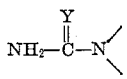

where Y is a member selected from the class consisting of O, S and N— and where the free valences on the nitrogen atoms are attached to atoms selected from the group consisting of hydrogen and carbon atoms and (2) a reaction product of phosphorous pentoxide and ammonia which is substantially insoluble in cold water.

13. A fire-retardant composition comprising (1) a water-dispersible, heat-convertible condensation product of an aldehyde and an amino compound containing from 1 to 9 carbon atoms and having the grouping

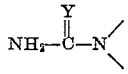

where Y is a member selected from the class consisting of O, S and N— and where the free valences on the nitrogen atoms are attached to atoms selected from the group consisting of carbon and hydrogen atoms, (2) a reaction product of phosphorous pentoxide and ammonia which is substantially insoluble in cold water, and (3) a cold-water-insoluble polyhydric compound consisting of carbon, hydrogen and oxygen atoms.

IVAN V. WILSON.
RALPH MAROTTA.

REFERENCES CITED

The following references are of record in the file of this patent:

UNITED STATES PATENTS

| Number | Name | Date |
|---|---|---|
| 2,122,122 | Woodstock | June 18, 1938 |
| 2,452,054 | Jones | Oct. 26, 1948 |